United States Patent [19]

Westercamp et al.

[11] Patent Number: 4,683,971

[45] Date of Patent: Aug. 4, 1987

[54] CONCENTRIC MOTOR ELECTRIC POWER STEERING FOR RACK AND PINION GEAR WITH CENTER TAKE-OFF

[75] Inventors: Kenneth L. Westercamp, Frankenmuth; Donald J. Kurecka, Saginaw, both of Mich.; David C. Yeack, Whitehouse, Ohio

[73] Assignee: General Motors Corporation, Detroit, Mich.

[21] Appl. No.: 776,128

[22] Filed: Sep. 13, 1985

[51] Int. Cl.[4] .............................................. B62D 5/04
[52] U.S. Cl. .................................... 180/79.1; 180/148
[58] Field of Search ....................... 180/79.1, 148, 142, 180/149, 154

[56] References Cited

U.S. PATENT DOCUMENTS 4,415,054  11/1983  Drotchas ............................ 180/79.1
4,428,450  1/1984  Stenstrom et al. .................. 180/148

Primary Examiner—John J. Love
Assistant Examiner—Donn McGiehan
Attorney, Agent, or Firm—Charles R. White

[57] ABSTRACT

An electric power assisted rack and pinion steering gear for steering the dirigible wheels of a vehicle comprising a rack housing with an end-mounted electric motor telescopically receiving and linearly driving a rack-screw assembly through ball nut and spur gearing.

3 Claims, 2 Drawing Figures

U.S. Patent   Aug. 4, 1987   4,683,971
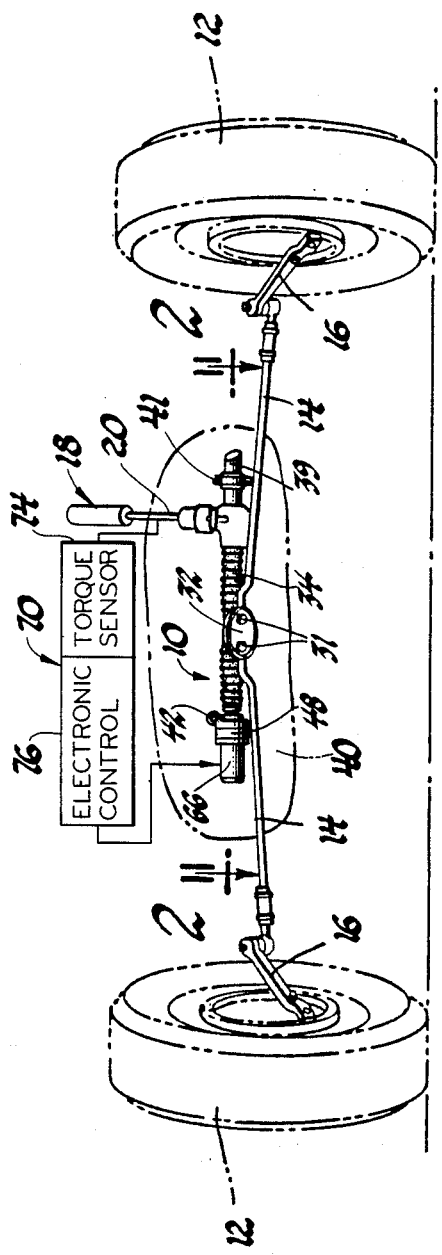
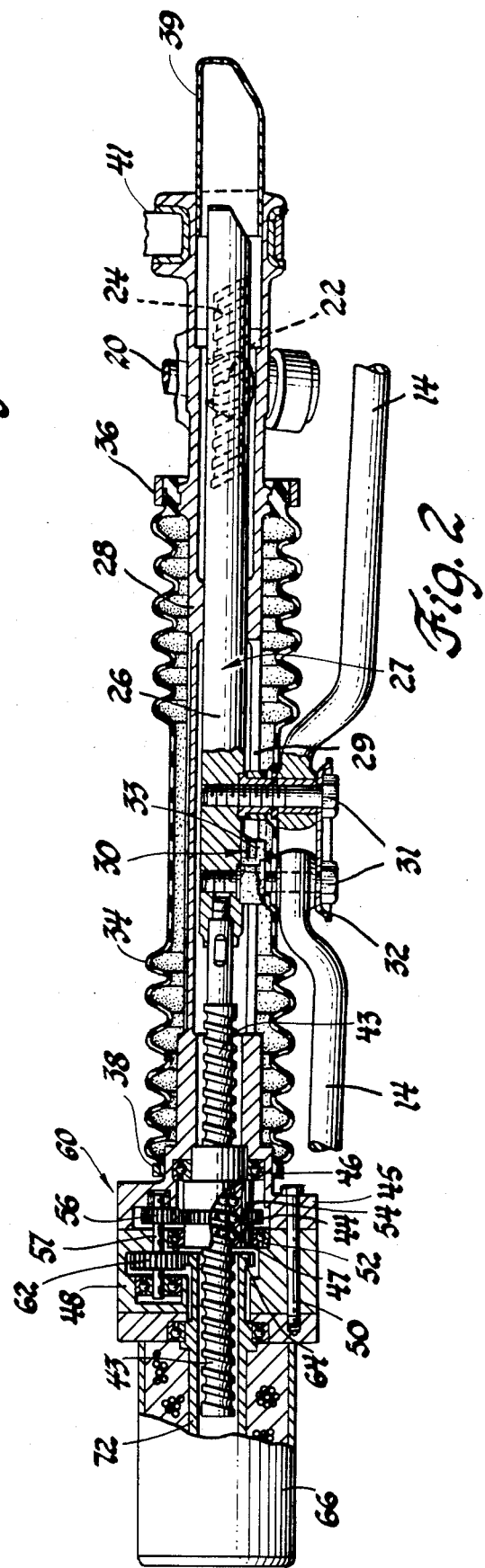

CONCENTRIC MOTOR ELECTRIC POWER STEERING FOR RACK AND PINION GEAR WITH CENTER TAKE-OFF

This invention relates to vehicle steering and more particularly to a new and improved low profile rack and pinion steering gear featuring an electric drive motor disposed concentric to and at one end of the gear housing to drive a discrete ball nut and thereby an actuator screw rack assembly to provide electric power assist vehicle steering.

Prior to the present invention, various rack and pinion steering gears have incorporated electric power assist motors for effectively reducing steering effort and improving driver comfort. These prior designs while providing good steering assist benefits are generally complex and bulky construction and are difficult to build and repair. The prior designs further do not provide for center take off utilized in many vehicles particularly compact front wheel drive vehicles requiring "high mount" of the gear to the front compartment cowling or other support structure.

In contrast to the prior designs, the present invention utilizes a discrete and substantially conventional ball nut for driving attachment to one end of the actuator screw-rack assembly for power assist. These components are easily accessible and are readily repairable or replaceable without dismantling the steering gear proper or the substantial teardown and rebuild of the gear. The screw of the actuator screw-rack strokes into the motor to foreshorten the design for compactness and adaptability to a wide range of installations.

There are two distinct characteristics that distinguish this invention from prior electric power steering systems. The first is a hollow shaft electric motor that is concentrically mounted within the rack and pinion housing. The second is that the standard rack has been designed to a combination actuator screw-rack assembly with approximately one-half its length in actuator ball threads and the other half in rack teeth. The actuator-screw travels through the hollow shaft of the motor. The motor is geared to a rotatable ball nut which is axially fixed in housing. When the hollow motor shaft revolves, the ball nut is driven in a spinning motion and which through interconnecting ball trains pushes the radially fixed actuator rack left or right, depending upon the direction of the motor revolution.

An advantage of this design over the conventional electric power steering systems is the redistribution of volume used by the unit. In many cases, the concentric and end motor design permits installation of electric power steering where an axially perpendicular motor or other prior designs simply will not fit in the vehicle.

In a preferred embodiment of the present invention, a concentric electric drive motor is mounted at one end of the steering gear actuator screw-rack assembly with a selectively reversible output which rotatably drives a discrete ball nut through spur gearing. A conventional ball nut screw forming part of the screw rack assembly and extending through the ball nut is linearly driven in response to powered rotation of the nut. This screw, telescoping from the interior of the motor into the rack housing, is drivingly connected to one end of an elongated rack forming the other part of the screw rack assembly. A toothed section of the rack meshes with a pinion gear that is rotatably driven from the steering shaft by a vehicle operator through a conventional steering wheel and shaft. A control system senses the direction and torque load from the vehicle operator to control direction and output of the motor for effective power assist steering. With this design a foreshortened and low profile is provided, preferably with a center take off, for a wide range of applications with improved electrically driven power assist input to the steerable wheels of the vehicle.

It is a feature, object and advantage of this invention to provide a new and improved electrically driven power assist rack and pinion steering gear incorporating a discrete ball nut and screw-rack assembly operatively connected to a reversible electric drive motor and to mechanical input through a pinion manually turned by the vehicle operator.

It is another feature, object and advantage of this invention to provide a new and improved electric power assist rack and pinion steering gear having a concentric end-mount motor driving a ball nut and screw operatively connected to the rack which has a take off for attachment with the tie rods operatively connected to the steerable wheels of the vehicle.

Another feature, object and advantage of this invention is to provide a new and improved power assist rack and pinion power steering gear which has a concentric electric motor mounted at one end of the rack housing which drives a ball nut and screw that telescopes into the motor and is drivingly attached to the linearly movable rack which is in turn mechanically driven through a pinion by a vehicle operator through the steering wheel.

These and other features, objects and advantages of this invention will be more apparent from the following detailed description and drawing in which:

FIG. 1 is a front view of a front portion of a rack and pinion power steering gear illustrating a preferred embodiment of this invention.

FIG. 2 is an enlarged view partially in cross-section of the steering gear of FIG. 1.

Turning now in greater detail to the drawing, there is shown in FIG. 1, a rack and pinion steering gear 10 operatively connected to a pair of dirigible road wheels 12 by tie rod assemblies 14 and steering arms 16. The steering gear 10 has mechanical input through a steering shaft assembly 18 that incorporates a torsion bar 20 adapted to be turned by a vehicle operator through a conventional steering wheel, not shown. The steering shaft assembly 18 is drivingly connected to a pinion gear 22 whose teeth mesh with the teeth 24 of an elongated rack 26 forming a part of a screw-rack assembly 27 that is mounted for linear sliding movement in a tubular housing 28 preferably of a suitable lightweight metal such as aluminum. With this arrangement, rotation of the pinion gear 22 by the vehicle operator through the steering shaft assembly 18 will cause lateral sliding movement of the rack 26 to the left or right direction according to the direction of steering input to effect selected mechanical steering of road wheels 12 with or without power assist. The steering gear housing 28 is formed with a generally rectilinear inner opening, the side walls of which form a track 29 for a rack guide assembly 30. The rack guide assembly 30 provides a slidable center take off carriage operating with low friction in the track 29. The rack guide assembly and bolt members 31 form the center take off connection of the rack 26 coupled to the ends of the tie rods 14. As shown in FIG. 2, the bolt members 31 project through the bolt support plate 32 and cylindrical steel bushings mounted in cylindrical openings in the body 33 of the rack guide assembly into threaded connection with the rack 26. An elongated convoluted boot 34 of elastomeric material stretches over the housing 28 from end clamp 36 adjacent to pinion 22 to end clamp 38 at the enlarged end of the housing. With this boot and with end cover 39 mounted in the left side end of the housing the internal components are enclosed and protected from the outside environment.

If the operator input torque is sufficiently high, the torsion bar 20 will deflect in accordance with the amount of input. A torque sensor will pick up the amount of deflection to trigger electric power assist steering described below.

The gear housing 28 is, in this illustration, secured in a high mount position to a cowl 40 or other support structure of the vehicle by left side bracket 41 and by a threaded fastener 42 on the right side. The right side end of the rack 26 is threaded or otherwise connected to the end of an elongated screw 43 which forms the other part of the screw-rack assembly 27. The screw 43 extends axially through the housing and operatively through a ball nut 44 rotatably mounted within a large diameter end portion 45 of the housing by an inboard ball bearing assembly 46. The ball nut 44 and screw 43 are drivingly connected by conventional ball train 47, and form an assembly for translating rotational input into linear output. Connector housing 48 secured to the enlarged end 45 of the steering gear housing 28 by threaded fasteners 50 carries ball bearing assembly 52 which supports the ball nut 44 at its outboard end. The ball nut 44 has an external spur gear 54 secured to the outer periphery thereof that meshes with a small diameter spur gear 56 mounted by a shaft 57 that is supported by bearings in the end portion 45 of the gear housing 28 and the connector housing 48. The spur gear 56 is driven through shaft 57 by a spur gear set 60 comprised of meshing spur gears 62, 64 mounted in connector housing 48.

Secured to the outer end of connector housing 48 by threaded fasteners, such as fastener 50, is an electric motor 66. This motor is a reversible motor whose output and direction are controlled by a suitable control system 70 diagramatically illustrated in FIG. 1. The electric motor 66 has a rotatable hollow output shaft 72 which extends into the connector housing 48 and telescopically receives the end of the screw 43 of the screw rack assembly as it is linearly moved to the right in response to appropriate rotation of ball nut 44. This arrangement foreshortens the overall length of the gear and makes it more adaptable for a wide range of applications. The output shaft 72 terminates in the spur gear 64 and the motor can thus drive the ball nut 44 and screw 43 and the rack attached thereto through the spur gearing at any selected torque and speed through appropriate selection of the spur gear diameters and tooth numbers. The controls 70 include a torque sensor 74 which picks up steering direction and effort from torsion bar 20 which is deflected on steering input. This provides input to the electronic control 76 which energizes the electric motor for direction and output. When mechanical steering effort is terminated by the release of the steering wheel by the vehicle operator, the deflection of the torsion bar will terminate and the geometry of the steering linkage will return the steerable wheels for straight ahead position.

While a preferred embodiment of this invention has been illustrated, other embodiments will now become apparent to those skilled in the art. Accordingly, these obvious embodiments are intended to be covered by the following claims.

The embodiments of the invention in which an exclusive property or privilege is claimed are defined as follows:

1. A power assisted steering gear for steering the dirigible wheels of a vehicle comprising a housing, a steering gear rack disposed for linear movement within said housing, a pinion gear rotatably operated by a steering force input applied by a vehicle operator operatively meshing with the rack for linearly moving said rack, connector means operatively connecting said rack with the dirigible wheels of the vehicle for steering said wheels in response to the linear movement of said rack, a ball nut rotatably mounted adjacent to one end of said rack housing, a linearly movable screw operatively attached to one end of said rack and operatively extending through said ball nut for linear movement in response to rotation of said ball nut, and electric motor means mounted to one end of said rack housing, said motor means having a hollow output shaft telescopically receiving said screw, and gear means operatively driven by said hollow output shaft and operatively connected to said ball nut to rotatably drive said ball nut to linearly move said screw and said rack in response to predetermined mechanical force input applied to said pinion gear by said vehicle operator for power assist steering.

2. A power assisted steering gear for steering the dirigible wheels of a vehicle comprising a housing, an elongated steering gear rack disposed for linear movement within said housing, a pinion gear rotatably driven by a vehicle operator operatively meshing with the rack for mechanically and linearly moving said rack, connector means operatively connecting said rack with the dirigible wheels of the vehicle for steering said wheels in response to the linear movement of said rack, a ball nut, bearing means mounting said ball nut for rotation in one end of said housing, a linearly movable screw operatively secured to one end of said rack and operatively extending through said ball nut for linear movement in response to rotation of said ball nut, and electric motor means mounted to one end of said rack housing, said motor means having a hollow output shaft telescopically receiving said screw, and gear train means operatively connecting said hollow output shaft to said ball nut to turn said ball nut in response to predetermined mechanical force input applied to said pinion gear by said vehicle operator for power assist steering.

3. A power assisted steering gear for steering the dirigible wheels of a vehicle comprising a housing, a steering gear rack disposed for linear movement within said housing, a pinion gear rotated by steering effort applied by a vehicle operator and operatively meshing with the rack for linearly moving said rack, connector means secured to a centralized portion of said rack for operatively connecting said rack with the dirigible wheels of the vehicle for steering said wheels in response to the linear movement of said rack, a ball nut mounted adjacent to one end of said rack housing, a linearly moveable screw operatively attached to one end of said rack and operatively extending through said ball nut for linear movement in response to rotation of said ball nut, and electric motor means secured to one end of said rack housing, said motor means having an elongated tubular output shaft telescopically receiving an end portion of said screw, and gear means operatively driven by said hollow output shaft and drivingly connected to said ball nut to rotate said ball nut to linearly move said screw and said rack in response to predetermined mechanical force input applied to said pinion gear by said vehicle operator for electric power assist steering.

* * * * *